United States Patent
Whiting et al.

[11] Patent Number: 6,130,519
[45] Date of Patent: Oct. 10, 2000

[54] PORTABLE BATTERY CHARGER INCLUDING AUTO-POLARITY SWITCH

[75] Inventors: John S. Whiting, Plymouth; Branden M. Reid, Minneapolis, both of Minn.

[73] Assignee: Century Mfg. Co., Minneapolis, Minn.

[21] Appl. No.: 09/400,423

[22] Filed: Sep. 21, 1999

Related U.S. Application Data

[60] Provisional application No. 60/104,651, Oct. 16, 1998.

[51] Int. Cl.$^7$ ........................................ H02J 7/00
[52] U.S. Cl. .................................................. 320/105
[58] Field of Search .................................. 320/103, 104, 320/105

[56] References Cited

U.S. PATENT DOCUMENTS

| | | | |
|---|---|---|---|
| 4,667,141 | 5/1987 | Steele | 320/105 |
| 4,692,680 | 9/1987 | Sherer | 320/105 |
| 4,769,586 | 9/1988 | Kazmierowicz | 320/105 |
| 4,938,712 | 7/1990 | Black | 320/105 |
| 5,083,076 | 1/1992 | Scott | 320/105 |
| 5,103,155 | 4/1992 | Joannou | 320/105 |
| 5,589,292 | 12/1996 | Rozon | 429/170 |
| 5,635,818 | 6/1997 | Quintero | 320/105 |
| 5,767,661 | 6/1998 | Williams | 320/152 |
| 5,982,138 | 11/1999 | Krieger | 320/105 |
| 5,993,250 | 11/1999 | Hayman | 320/105 |
| 6,002,235 | 12/1999 | Clore | 320/105 |

FOREIGN PATENT DOCUMENTS

WO 98/01928  1/1998  WIPO .

*Primary Examiner*—Peter S. Wong
*Assistant Examiner*—Pia Tibbits
*Attorney, Agent, or Firm*—Merchant & Gould P.C.

[57] ABSTRACT

A portable hand-carrying auto-polarity battery booster apparatus includes a power storage device which is capable of providing power to an electrical system such as a battery. For example, the portable apparatus can be used to jump start a vehicle with a dead battery. The apparatus is compact in size which encloses the power storage device, the at least four connecting cables, and many other electrical circuits in a compact housing. The portable apparatus also includes an auto-polarity switch in the housing which ensures a proper polarity connection between the power storage device of the apparatus and the electrical system, as well as an ON/OFF switch located between the battery and the auto-polarity switch.

21 Claims, 12 Drawing Sheets

6,130,519

PORTABLE BATTERY CHARGER INCLUDING AUTO-POLARITY SWITCH

This application claims the benefit of Provisional application Ser. No. 60/104,651 filed Oct. 16, 1998.

FIELD OF THE INVENTION

This invention relates generally to portable charging systems, and more specifically to portable charging systems including an auto-polarity switch for providing a proper polarity connection in charging batteries or jump starting an automobile which has a discharged battery.

BACKGROUND OF THE INVENTION

Most automobiles or other devices powered by an internal combustion engine, such as watercraft, etc., rely at least in part on a battery as part of its power source. For example, an automobile needs a battery to start the engine operating (the engine must be spun up to speed externally before they can operate). Once the engine is operating or running, the battery is charged by a generator connected to the engine. The battery is usually able to store enough charge for the periods that the engine is not running in order to start the engine when needed.

There are many things that will cause a battery to lose its charge, such as leaving the lights on or playing the radio after the engine is turned off, or a short circuit in the battery which drains the battery. When there is not enough charge in the battery, the engine cannot be started, i.e. the battery is discharged. As a result, the battery must be recharged or boosted by another power source. Very often another vehicle is brought to the vicinity of the vehicle with the discharged battery to jump start the vehicle. Another solution was proposed by U.S. Pat. No. 5,589,292 which provides a portable booster battery to recharge the discharged battery.

One concern in using a portable battery such as the portable booster battery disclosed U.S. Pat. No. 5,589,292 to charge batteries that have been discharged is making sure that proper polarity between the portable battery and the battery to be charged is proper. It is imperative to connect the portable battery and the battery to be charged with proper polarity, i.e. positive to positive terminal connections and negative to negative terminal connections. Failure to do so will rapidly drain the portable battery and further cause serious damage to either or both electrical systems that the two batteries are used in. However, it is often difficult to determine which battery terminal is positive and which is negative because of the accumulation of dirt or lack of lighting.

The polarity problem has been solved by a variety of methods in the battery jumper cable arrangement environment, such as the technique disclosed in U.S. Pat. No. 4,400,658. There is a need for a portable battery charging system that has the polarity problem solved. Such a portable charging system would need to provide a charge or boost to another battery regardless of the charging terminals of the battery to be charged to which the positive or negative terminals of the portable charging system are connected. Such a system would eliminate the problems and dangers associated with incorrect charging battery to discharged battery terminal connections.

SUMMARY OF THE INVENTION

The present invention relates to a portable battery with an auto-polarity switch for providing a proper polarity connection in charging a battery of a device, such as an automobile, i.e. jump starting an automobile, etc.

The present invention provides for a portable, auto-polarity battery booster apparatus. The portable apparatus in accordance with the present invention includes a power storage device, such as a battery, which is capable of providing power to an electrical system such as another battery. The portable apparatus can also be used in many other power supply applications or battery charging applications. For example, it can be used to jump start a vehicle with a dead battery. The apparatus can also be recharged by an outside power source. Further, the portable apparatus ensures a proper polarity connection between the power storage device of the apparatus and the electrical system.

BRIEF DESCRIPTION OF THE DRAWINGS

Referring to the drawings wherein like numerals represent like parts throughout the several views.

GENERAL DESCRIPTION

Figure 1:
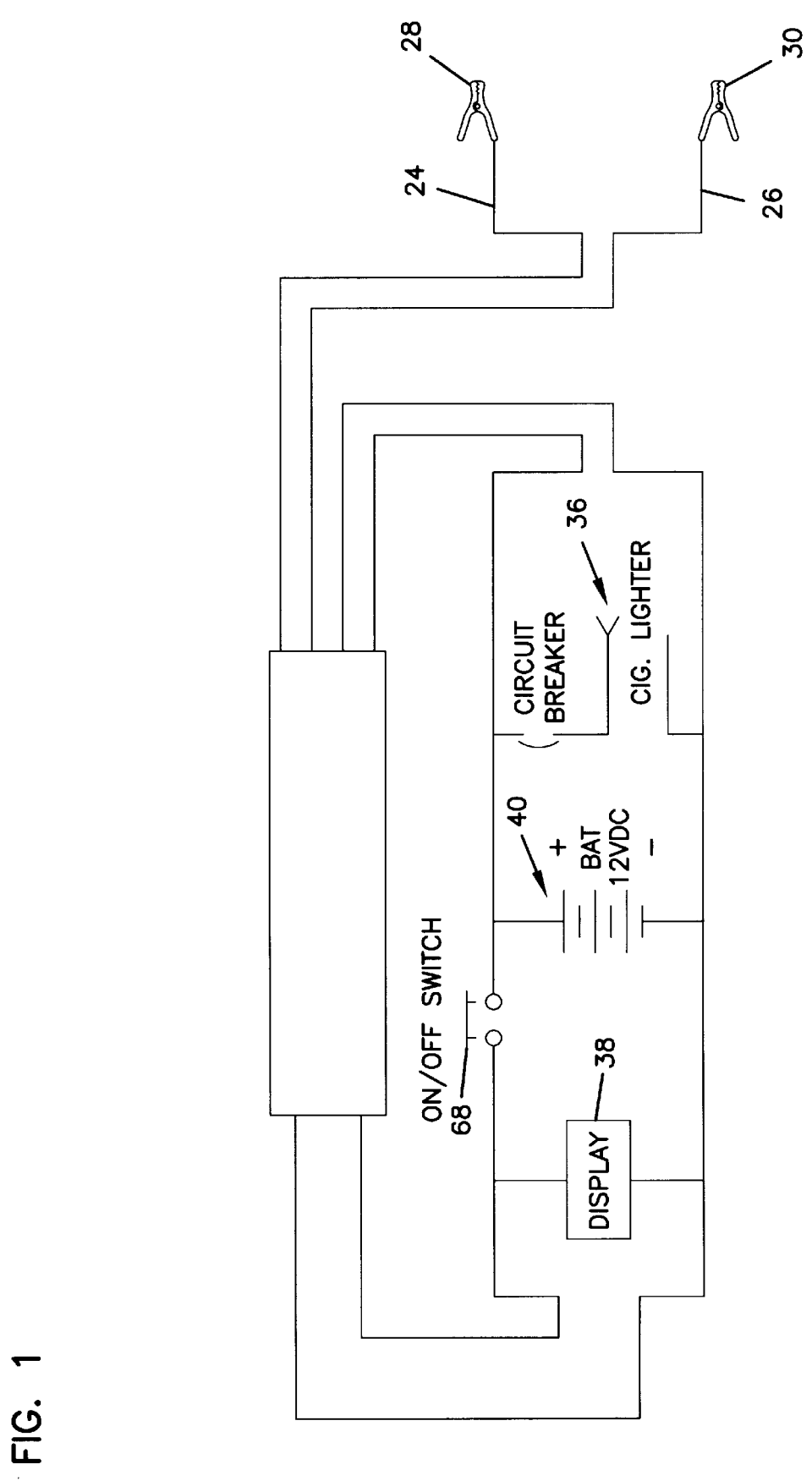
FIG. 1 is a schematic view of a general embodiment of the auto-polarity battery booster apparatus.
Figure 2:
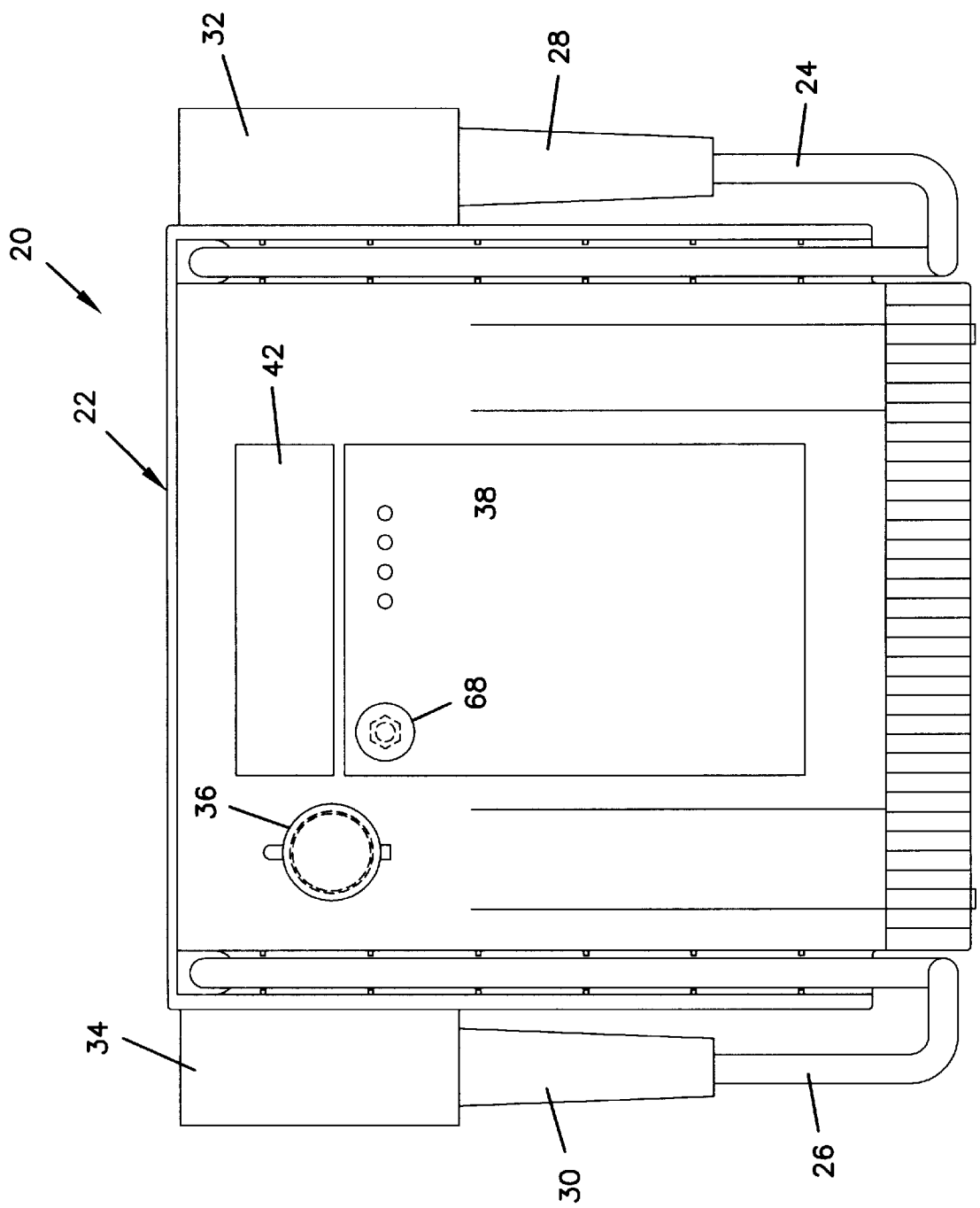
FIG. 2 is a front view of a portable, auto-polarity battery booster apparatus in accordance with the present invention.
Figure 3:
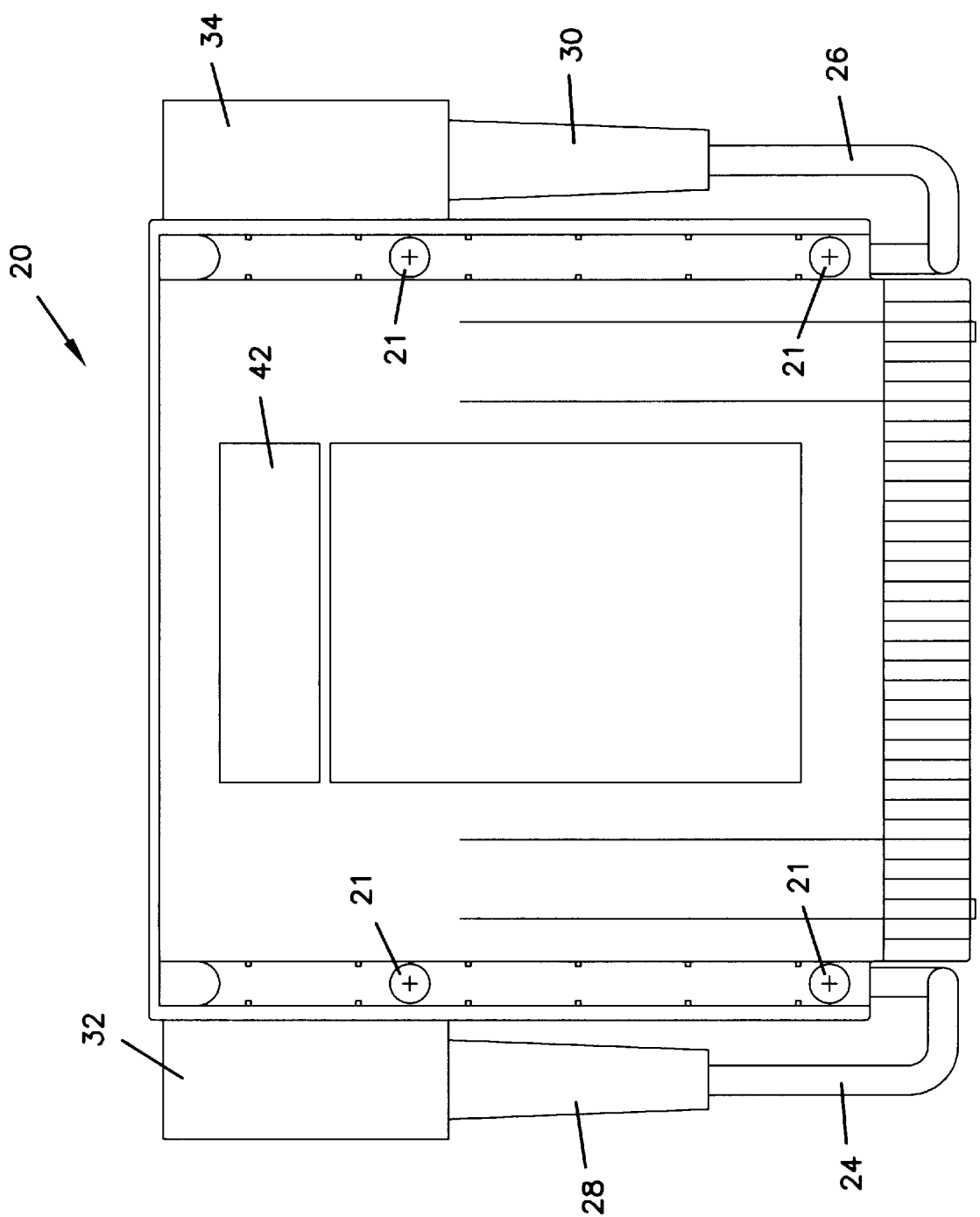
FIG. 3 is a back view of the battery booster apparatus of FIG. 2.
Figure 4:
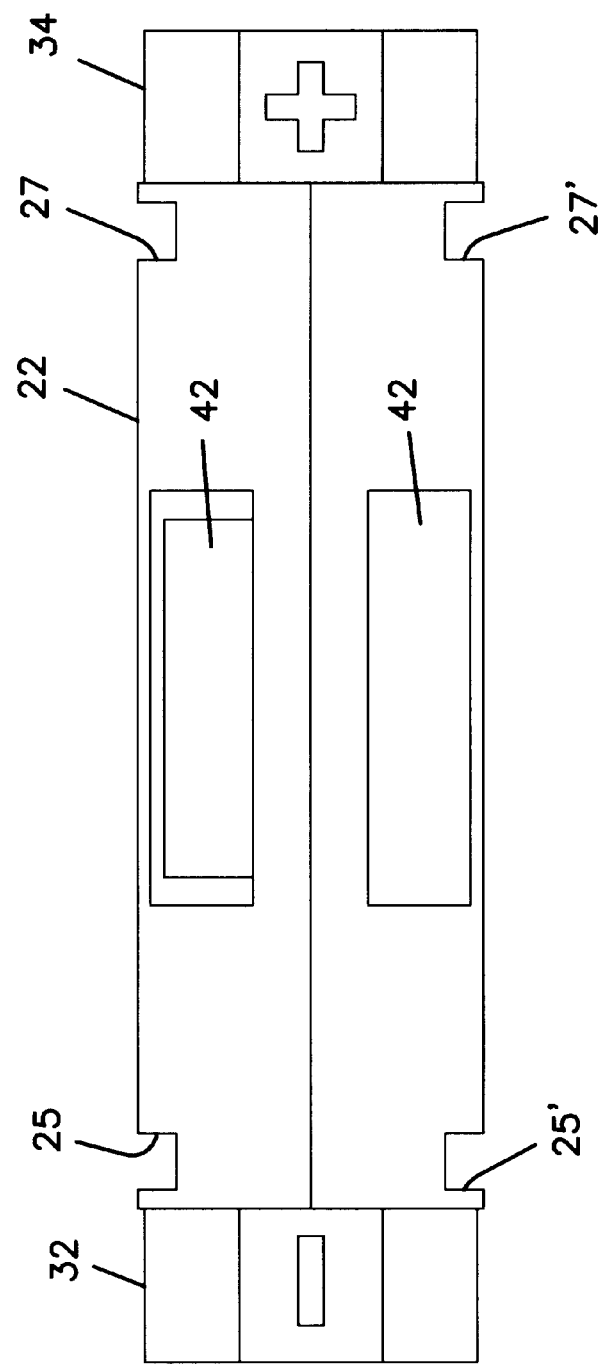
FIG. 4 is a top view of the battery booster apparatus of FIG. 2.

In one embodiment constructed according to the principles of the present invention, a portable battery booster apparatus for boosting an electrical system with a first terminal and a second terminal, comprises a battery having a first terminal and a second terminal, a housing enclosing the battery and the first and second terminals of the battery, an automatic switch having a first pair of contacts and a second pair of contacts, the switch being enclosed in the housing, a first cable with a first end connected to the first terminal of the battery and a second end selectively connected to a first contact of the first pair of contacts of the switch, the first cable being enclosed in the housing, a second cable with a first end connected to the second terminal of the battery and a second end selectively connected to a second contact of the first pair of contacts of the switch, the second cable being enclosed in the housing, a third cable with a first end connected to a first contact of the second pair of contacts of the switch, the first end of the third cable being partially enclosed in the housing, a fourth cable with a first end connected to a second contact of the second pair of contacts of the switch, the first end of the fourth cable being partially enclosed in the housing, a first clamp connecting to a second end of the third cable, the first clamp being detachably mounted onto a first side of outside of the housing, a second clamp connecting to a second end of the fourth cable, the second clamp being detachably mounted onto a second side of the outside of the housing, and wherein when the electrical system is boosted by the battery booster apparatus, the first clamp and the second clamp connect to the first terminal and the second terminal of the electrical system, respectively, such that the first and second terminals of the battery are electrically connected to the first and second terminals of the electrical system, the switch switches connections between the first pair of contacts and the second pair of the contacts to ensure that the first terminal of the battery and the first terminal of the electrical system have the same polarity, and the second terminal of the battery and the second terminal of the electrical system have the same polarity.

In one aspect of the invention, the apparatus may also include an ON/OFF switch. The ON/OFF switch is connected between the battery and the switch. When the ON/OFF switch is off, the switch is in a neutral, non-contacting position, and the first pair of contacts are not electrically connected with the second pair of contacts. When the ON/OFF switch is on, the electrical system is boosted by the battery.

In another aspect of the invention, in a first embodiment the auto-polarity switch comprises three coils which are wound around two cores and a plunger, respectively. The plunger is moved to a first contacting position when the first terminals of the battery and the electrical system have the same polarity and the second terminals of the battery and the electrical system have the same polarity. The plunger is moved to a second contacting position when the first terminals of the battery and the electrical system have the opposite polarity and the second terminals of the battery and the electrical system have the opposite polarity. In one embodiment, the switch is a double pole double throw switch.

In the first embodiment of the switch in accordance with the invention, the coil assembly has a bobbin shape with two dividers for separating the first, second, and third coils from each other. In addition, the switch may include an enclosure for enclosing the coil assembly. The plunger extends from the enclosure and connects to a double pole double throw switch.

In the first embodiment of the switch in accordance with the present invention, the first pair of contacts are arranged and configured to be a pair of bottom switch contacts and a pair of top switch contacts. When the plunger is in the first contacting position, the bottom switch contacts are connected to the second pair of contacts, and when the plunger is in the second contacting position, the top switch contacts are connected to the second pair of contacts.

In a second embodiment, the auto-polarity switch includes a polarity sensing circuit, and a reversing relay operated by the sensing circuit. The sensing circuit includes a full wave rectifier electrically connected to a differential amplifier circuit which is electrically connected to external cables having clamps electrically connected thereto, which are to be removably attached to the battery to be charged. The full wave rectifier provides a positive voltage to the polarity sensing circuit regardless of the polarity connection of the clamps to the source to be charged. The differential amplifier circuit is electrically connected to a first relay coil and a second relay coil which are electrically connected to the relay control circuit and cause selective activation of movable contacts in the relay to so that the reversing relay acts as a switch in switching the connections between a first pair of contacts and a second pair of the contacts to ensure that a first terminal of the battery and a first terminal of the electrical system have the same polarity, and a second terminal of the battery and a second terminal of the electrical system have the same polarity.

In other embodiments, such as the embodiment shown in FIG. 1, the auto-polarity switch may be an electromechanical type, or an electronic type comprised of solid state devices or microprocessor type, all of which would include a type of change-over switch. In such other embodiments the auto-polarity switch would include a polarity detector comprised of a electric differential type, a processing circuit and two sets of pairs of electrical transmission conducting wires terminals. The switch would be installed between the portable charger battery 40 and the external charging source connection cables 24 and 26 to provide for switching between two pair of contacts connected to a pair of electrical transmission conducting wires terminals 28 and 30.

It will be appreciated that other types of suitable auto-polarity switches can be used without departing from the present invention. The examples of the other types of switches, but not limited to these examples, are solid-state switches or other electro-mechanical switching devices. It will be also appreciated that other conventional polarity detection/protection devices, or automatic polarity sensing battery charger devices can be used without departing from the present invention.

In another aspect of the invention, the housing includes switch retention grooves for retaining the switch in one side of the housing. The housing also includes cable A retention grooves for retaining the first, second, third, and fourth cables to the housing. Further, the housing includes battery retention grooves for retaining the battery to the housing.

In yet another aspect of the invention, the apparatus includes a first holster for receiving and covering the first clamp and a second holster for receiving and covering the second clamp. In one embodiment, the first and second holsters are attached to the outside of the housing. Further, the first and second holsters are pivotably connected to the housing.

In an additional aspect of the present invention, a plurality of accessories can be included to provide additional features and advantages of the invention. For example, a display can be included to display a level of charge remaining in the battery. A cigarette lighter female receptacle member can also be added to provide power to an electrical system which is equipped with a male cigarette lighter plug. Further, a male cigarette lighter plug member can be added to the present invention to provide it with the ability to connect the battery in the housing to a power source outside the housing to recharge the battery. Furthermore, a handle can be included to carry the battery booster apparatus such that the housing and the handle form a portable box unit.

While the invention will be described with respect to a preferred embodiment configuration and with respect to particular components, it will be understood that the invention is not to be construed as limited by such configurations or components. Further, while the preferred embodiment of the invention will be described in relation to boosting or recharging a vehicle or automobile battery, it will be understood that the scope of the invention is not to be limited by this environment in which the preferred embodiment is described herein.

These and various other advantages and features which characterize the invention are pointed out with particularity in the claims annexed hereto and forming a part hereof. However, for a better understanding of the invention, its advantages and objectives obtained by its use, reference should be had to the drawings which form a further part hereof and to the accompanying descriptive matter, in which there is illustrated and described a preferred embodiment to the invention.

DETAILED DESCRIPTION OF THE PREFERRED EMBODIMENT

The present invention provides for a portable, auto-polarity battery booster apparatus. The portable apparatus in accordance with the present invention includes a power storage device which is capable of providing power to an electrical system such as a battery. The portable apparatus can also be used in many other power supply applications or battery charging applications. For example, it can be used to jump start a vehicle with a dead battery. The apparatus can also be recharged by an outside power source. Further, the portable apparatus ensures a proper polarity connection between the power storage device of the apparatus and the electrical system.

In the following description of the exemplary embodiment, reference is made to the accompanying drawings which form a part hereof, and in which is shown by way of illustration the specific embodiment in which the invention may be practiced. It is to be understood that other embodiments may be utilized when structural and other changes may be made without departing from the scope of the present invention.

Turning now to FIGS. 1–4, there is illustrated front, back, top, and bottom views of a preferred battery booster apparatus designated by the reference numeral 20. The apparatus 20 includes a housing 22 preferably made out of plastic. Electrical cables 24,26 extend out of the housing 22 and are retained along outside grooves 25,27 of the housing 22. Extra outside grooves 25', 27' can be arranged to wrap long cables and/or for aesthetic purposes. One end of each cable 24,26 is connected to a clamp 28,30 (best seen in FIG. 6), respectively. Each of the cables 24,26 is connected to either the positive terminal or the negative terminal of a power storage device, such as a battery 40 (best seen in FIG. 6), in the housing 22. Accordingly, one of the clamps can be called positive clamp (marked as "+" in FIGS. 3 and 4), and the other one can be called negative clamp (marked as "−"0 in FIGS. 3 and 4). As it will be discussed later, since the apparatus 20 has an auto-polarity switch 50 (best seen in FIG. 7), it does not matter which clamp is positive and which is negative when the clamps are in use.

Figure 5:
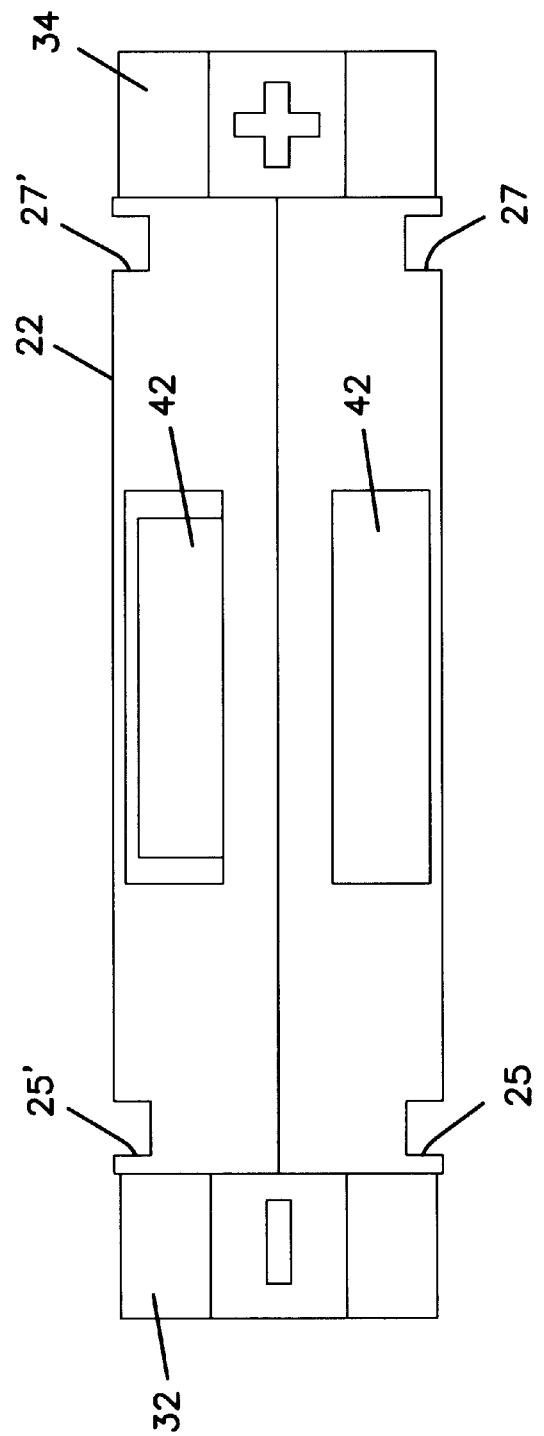
FIG. 5 is a bottom view of the battery booster apparatus of FIG. 2.

The clamps 28,30 are preferably received and covered by holsters 32,34, respectively, and are removably clamped to a bit within the holster. The holsters 32,34 help avoiding accidental electrical contacts between the clamps and adjacent items. A cigarette lighter receptacle member 36 can also be included in the apparatus 20 to provide power to electrical systems such as cell-phones, lighting, etc. A charge status display 38 can also be included in the apparatus 20 to display the level of charge remaining in the power storage device, such as the battery 40 (best seen in FIG. 5), in the housing 22. The display 38 can be arranged and configured preferably in a plurality of LED lights to show a series of charge status. It will be appreciated that other suitable display means can be used to indicate the charge status within the scope of the invention. Further, a handle 42 can be molded into the housing 22 to allow easy carrying of the apparatus 20 to the vicinity of the dead battery. It will be appreciated that other types of handles can be used within the principles of the invention. For example, an extra handle piece can be attached to the housing, etc.

Figure 6:
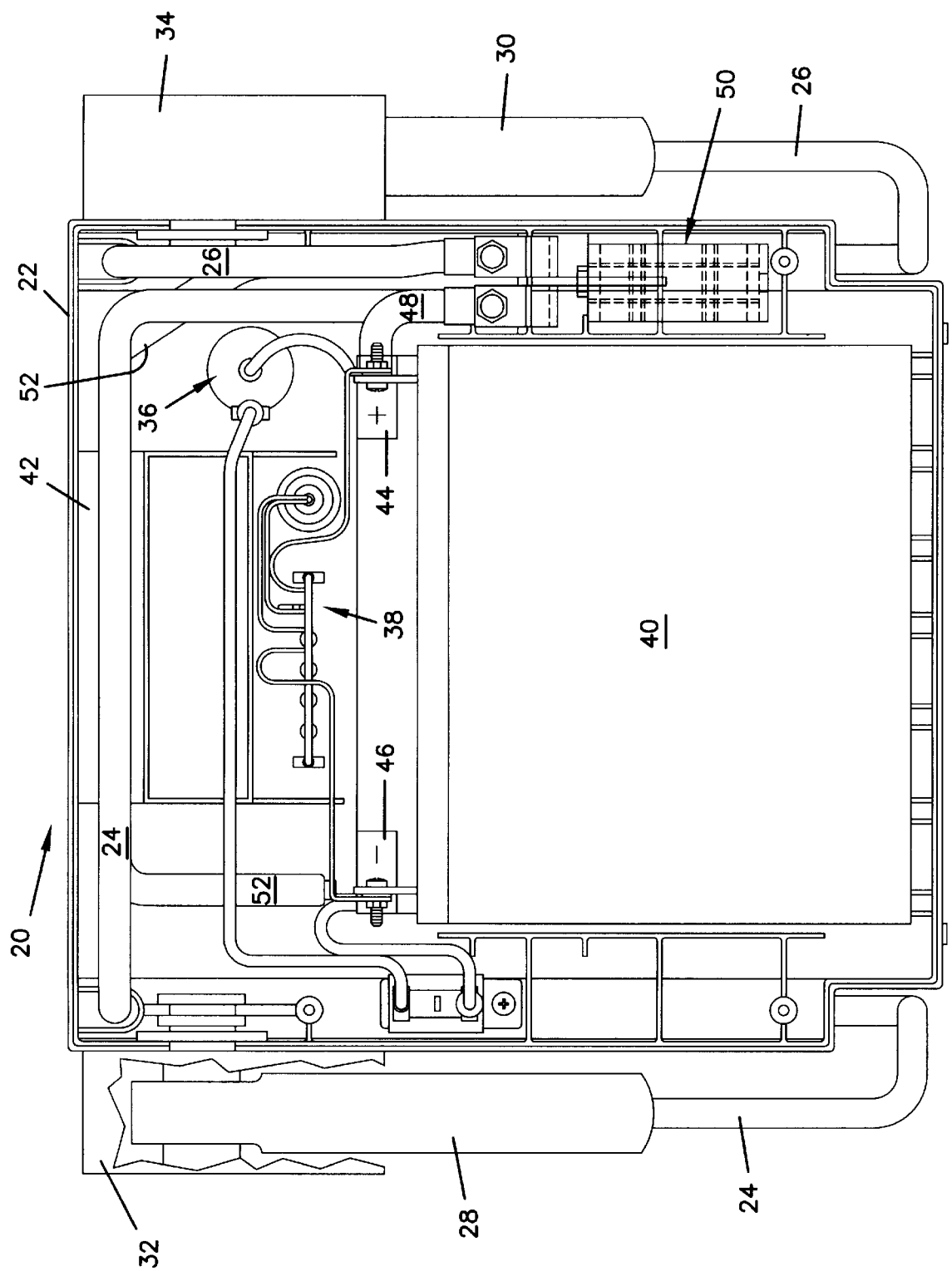
FIG. 6 is a plane view of the inside of the battery booster apparatus of FIG. 2.

FIG. 6 shows the internal details of the housing 22 (opened from the back side by removing the mounting screws 21). The battery 40 has a positive terminal 44 and a negative terminal 46. An electrical cable 48 is connected to the positive terminal 44 at one end of the cable 48. The other end of the cable 48 is connected to the auto-polarity switch 50. An electrical cable 52 is connected to the negative terminal 46 at one end of the cable 52. The other end of the cable 52 is connected to the switch 50. Also, it can be seen that the cable 24 extends from outside of the housing 22 to inside of the housing and is retained in the grooves of the housing. The other end of the cable 24 connects to the switch 50. Similarly, the cable 26 extends from outside of the housing 22 to inside of the housing and is retained in the grooves of the housing. The other end of the cable 26 connects to the switch 50. The details of the cigarette lighter receptacle member 36 and the display 38 are preferably shown in FIG. 5. It will be appreciated that other 3suitable arrangements of the cigarette lighter receptacle member 36 and the display 38 can be used without departing from the principles of the invention.

Figure 7:
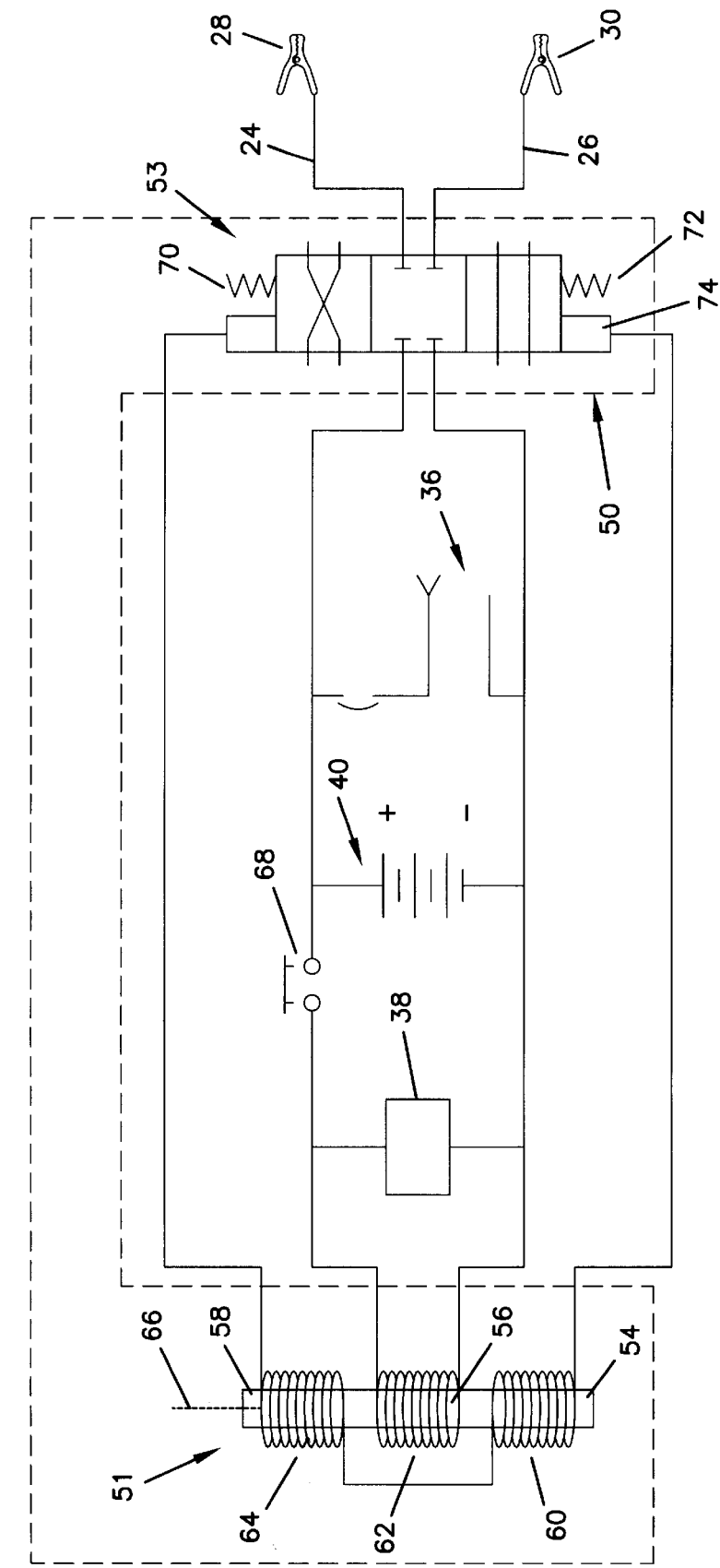
FIG. 7 is a schematic view of a specific embodiment of the auto-polarity battery booster apparatus.

FIG. 7 illustrates a schematic, functional view of the battery booster apparatus 20. The apparatus 20 has the auto-polarity switch 50 interfacing with the battery 40. The switch 50 preferably includes a coil assembly 51 and a switching assembly 53. The coil assembly 51 has three coils 60, 62, 64 wound around three core members 54, 56, 58, wherein the central core member 56 is a plunger, respectively. The three coils 60, 62 64, the outside cores 54, 58 and the central core (plunger) 56 are disposed along a longitudinal axis 66. The plunger 56 is placed between the outside cores 54, 58. The coil windings and three core assembly makes up two solenoids, a center solenoid comprised of core member 56 and windings 62 wound around the central core member 56 and an outside solenoid 65, 67, comprised of outside core members 54 and 58 and windings 60 and 64 wound around the outside core members 54, 56. The outside coil windings 60 and 64 of the outside solenoid are each wound with an equivalent number of turns. The center coil windings 62 of the central solenoid are wound with two times as many turns as either of outside coil windings 60, 64. Further, the windings of the first outside coil member 60 are opposite to the windings of the second outside coil member 64. The windings of the central coil 62 can be in the same direction as the windings of the first outside coil member 60 or in the same as the winding of the second outside coil member 64.

Accordingly, when the internal battery energizes the center coil windings 62, an electrical current flows through the center coil windings 62 (i.e. an ON/OFF switch 68 is closed) and the plunger 56 which is preferably comprised of a ferrous metal becomes magnetized. When there is no current flowing through the external coil windings 60 and 64 and the battery has energized the center coil windings 62, plunger 56 and switch contacts are held at a neutral position. This is because the center coil windings 62 is centered over the plunger 56 and there is no magnetic force being applied to the plunger 56 by either member of the outside solenoid. Outside coil windings 60 and 64 are connected in series and wound in opposite directions. The ends of outside coil windings 60 and 64 that are not connected in series are electrically connected to cables 24 and 26 and clamps 28 and 30. When the external clamps 28 and 30 are connected to the power source to be charged, current flows through the outside coil windings 60 and 64, causing outside core members 54 and 58 to be magnetized. The magnetization of outside core members 54 and 58 creates a force pulling or pushing central core member 56, depending on the polarity connection of clamps 28 and 30 to the power source to be charged, and the direction of the turns in coil windings 60, 62 and 64. When the outside coil windings 60 and 62 and the central coil winding 64 are all energized, current flowing through the outside coil windings 64 can either flow in the same direction as the current through the central coil windings 62 or in the opposite direction and current flowing through the outside coil windings 60 can either flow in the same direction as the current through central coil windings 62 or in the opposite direction. When current is flowing through the central coil windings 62 in a clockwise direction and through the outside coil windings 64 in a clockwise direction, it is flowing through outside coil windings 60 in a counter clockwise direction. Or, when current is flowing through central coil windings 62 in a clockwise direction and through the outside coil windings 64 in a counter clockwise direction, it is flowing through the outside coil windings 60 in a clockwise direction. The direction of current flowing through outside coil windings 60 and 64 depends on the polarity connection of clamps 28 and 30 to the power source to be charged.

Assuming that current is flowing through central coil windings 62 in a clockwise direction and through the outside coil windings 64 in a clockwise direction, it is flowing through outside coil windings 60 in a counter clockwise direction. Accordingly, the magnetic field in core 54 is opposite the magnetic field within central core 56. The opposing magnetic forces causes the magnetic field in core 54 to negate half the magnetic force in the central core 56. The magnetic field generated by core 58 is in the same direction as that within central core 56 and adds its magnetic energy to core 54, causing full coil strength to be centered in the direction of core 58. This causes the central core 56 to be pulled in the direction of outside core 58.

When the central core 56 is pulled in the direction of outside core 58, the two cores 56 and 58 are very close but do not touch. This is because if either the outside coils 60 and 64 or central coil 62 are no longer energized, by way of removing clamps 28 and 30 from the power source to be charged or opening switch 68, the air space provides the central core 56 with the positioning necessary to return back to its neutral position. The same would also be true when the central core 56 is pulled in the direction of core 54. The two cores 54 and 56 are very close, but do not touch. The air space between the two cores 54 and 56 provides the central core 56 with the positioning necessary to return back to its neutral position.

Figure 10:
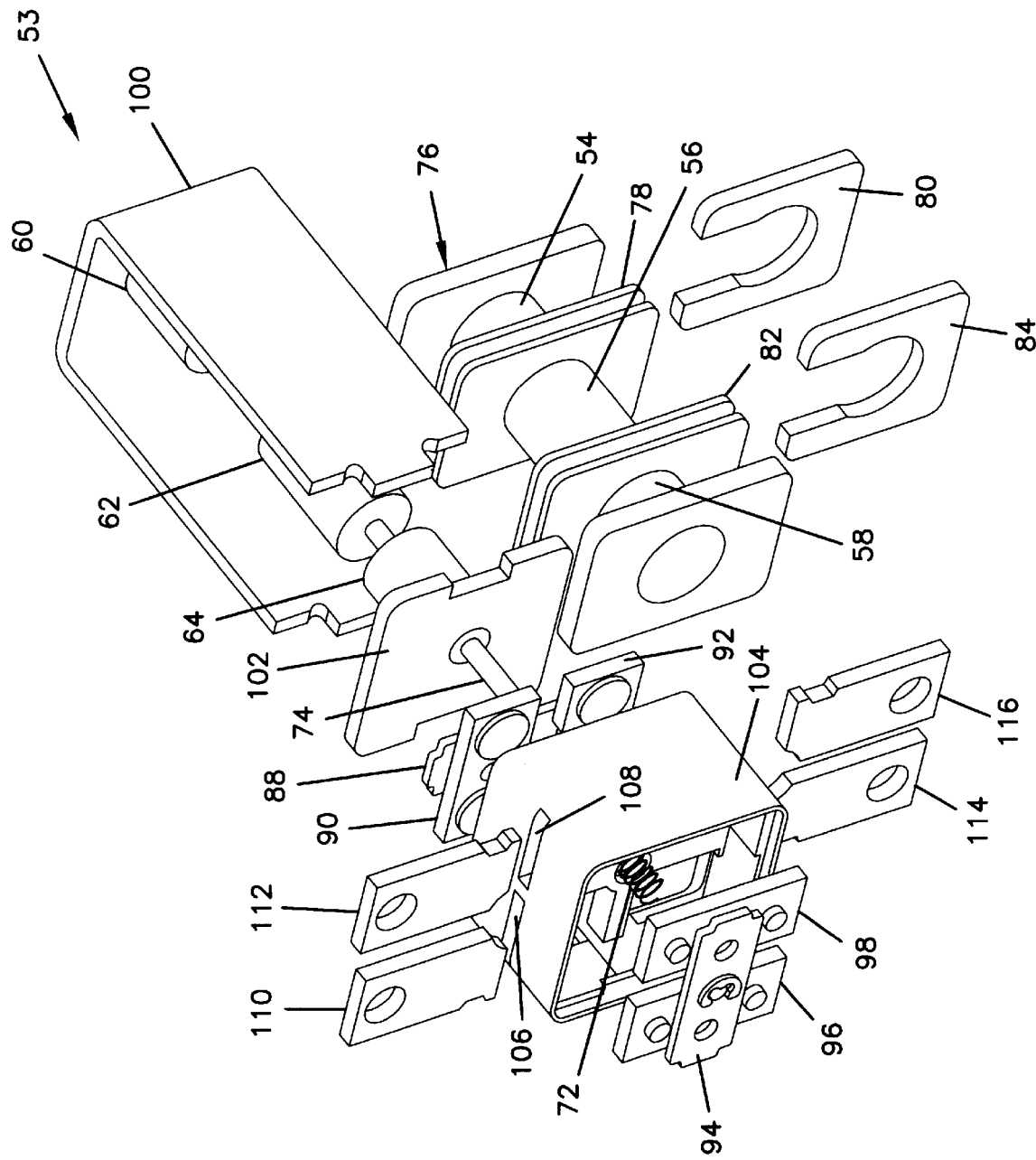
FIG. 10 is an exploded view of the auto-polarity switch.
Figure 11:
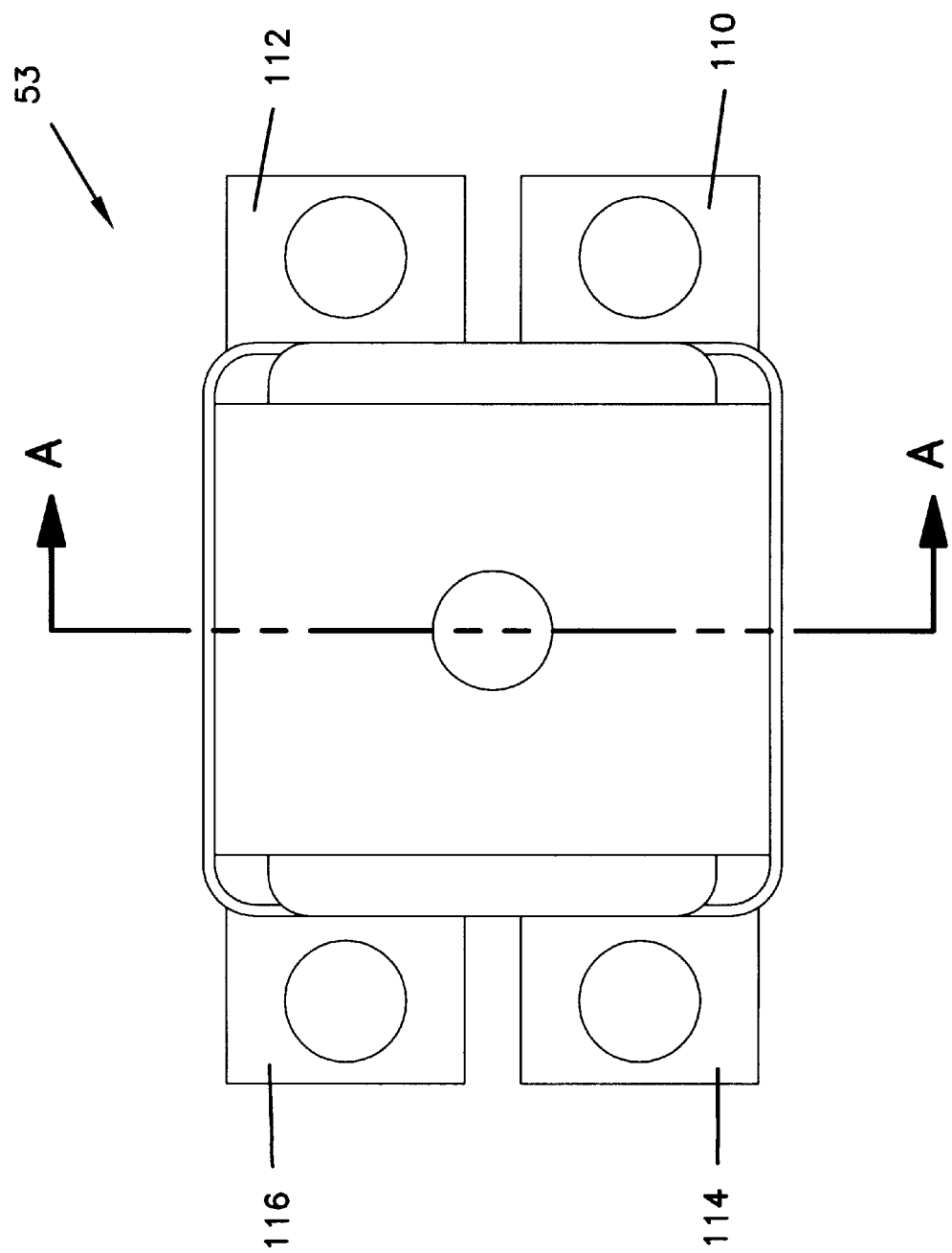
FIG. 11 is a front view of the auto-polarity switch.

A switch rod 74 is mounted on one end of the plunger 56 (best seen in FIG. 10). The plunger 56 is held between the two cores 60,64 by two springs 70,72. The springs 70,72 are shown schematically in FIG. 7. In one preferred embodiment, the springs 70,72 are attached to the switch rod 74, and the switch rod 74 is disposed proximate the center of the switch assembly 53. In this case, since the pulling forces are equal, the springs keep the plunger centered, i.e. the switch 50 is in a neutral, non-contacting position. To preserve the charges stored in the battery 40, the ON/OFF switch 68 is normally open.

FIGS. 8–12 illustrate details of the switch assembly 53. The coils 60, 62, 64 are wound around outside core members 54 and 58 and central core member 56. The coils 60 and 62 are separated by a divider 78. An insulating member 80 is mounted on the divider 78 to help insulate the magnetic fields generated by each of the coils 60, 62. Similarly, the coils 62 and 64 are separated by a divider 82. An insulating member 84 is mounted on the divider 82 to help insulate the magnetic fields generated by each of the coils 62, 64.

Figure 8:
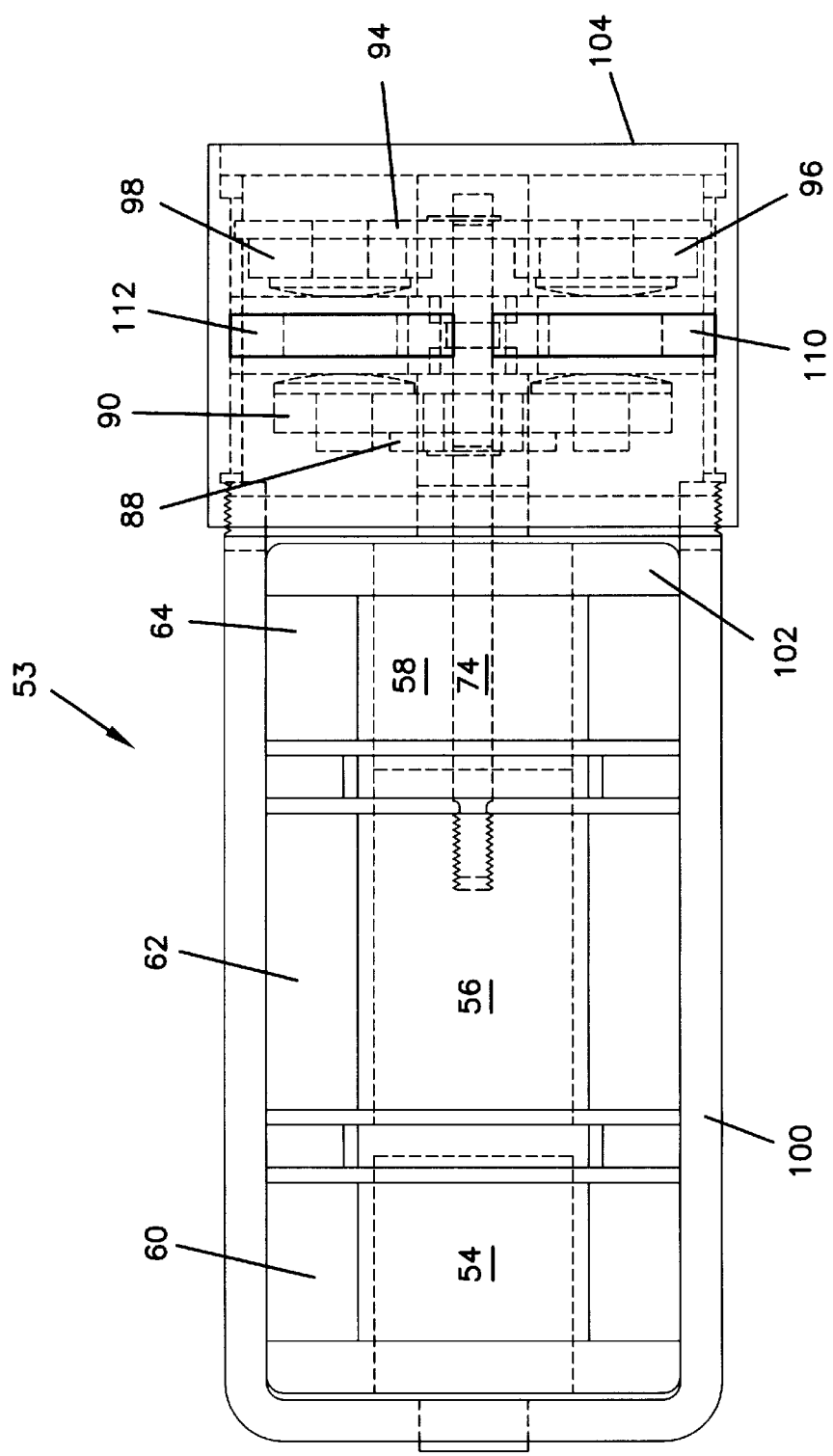
FIG. 8 is a plane view of one embodiment of an auto-polarity switch of the battery booster apparatus.
Figure 9:
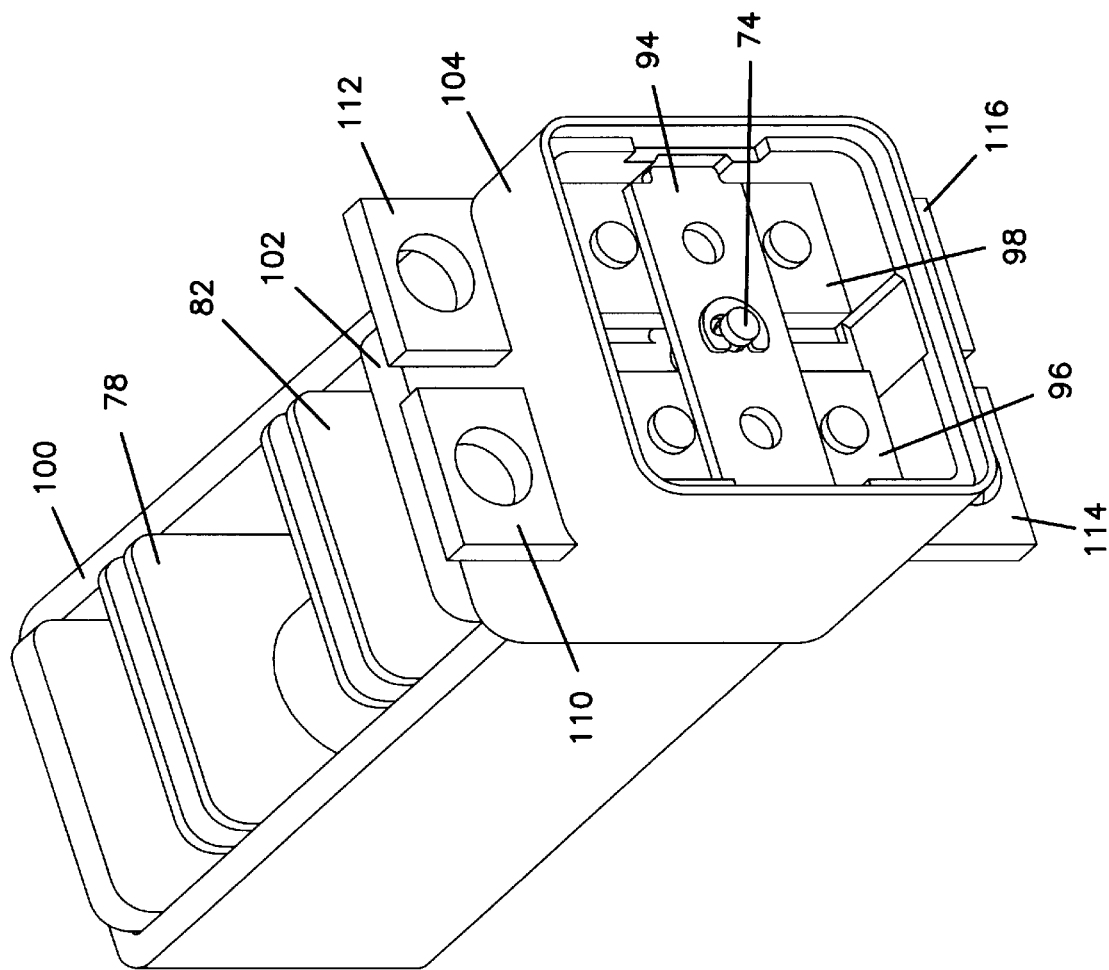
FIG. 9 is a perspective view of the auto-polarity switch.
Figure 12:
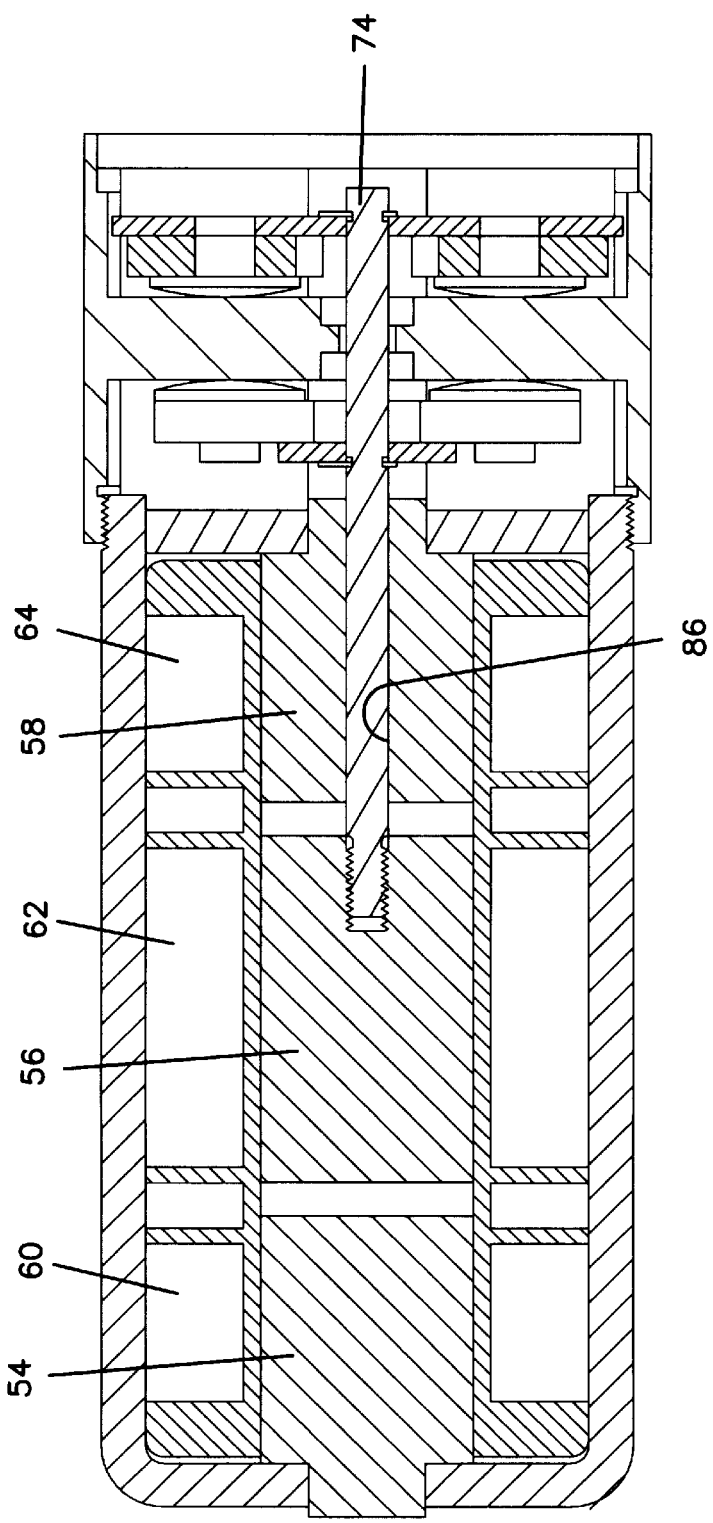
FIG. 12 is a cross-sectional view of the auto-polarity switch along line A—A of FIG. 11.

As shown in FIGS. 8 and 12, the switch rod 74 is mounted in the plunger 56 at one end, extends through a center bore 86 of the core 58, is mounted on a bottom switch plate 88 which links a pair of bottom switch contacts 90,92, is attached to the two springs 70,72 (only spring 72 is shown in FIG. 7), and is mounted on a top switch plate 94 which links a pair of top switch contacts 96,98. The coils, the plunger, and the cores are preferably disposed in an enclosure 100 with a cover 102. The bottom switch plate 88, the bottom switch contacts 90,92, the springs 70,72, the top switch plate 94, and the top switch contacts 96,98 are retained in an enclosure 104. The enclosure 104 has a pair of top slots 106,108 and a pair of bottom slots (not shown). A pair of top bus bars or terminals 110,112 are inserted in the top slots 106,108 and retained by the enclosure 104. A pair of bottom bus bars or terminals 114,116 are inserted in the bottom slots and retained by the enclosure 104.

In one embodiment, the terminal 110 is electrically connected to the positive terminal of the internal power storage device or the battery 40 via the cable 48 as shown in FIG. 6. The terminal 116 is electrically connected to the negative terminal of the internal power storage device or the battery 40 via the cable 52 as shown in FIG. 6. The terminals 112 and 114 are electrically connected to the terminals of the external power source, e.g. a dead battery, via the cable 24 and the cable 26 and via the clamps 28,30, respectively. It is generally required that a proper polarity be established between the external power source and the internal power source, i.e. the positive terminals are electrically connected to each other, and the negative terminals are electrically connected to each other. In the present invention, the switch 50 connects the terminals with proper polarity in an automatic fashion. First, it is assumed that the positive terminal of the external power source is connected to the bus bar or terminal 112 and the negative terminal of the external power source is connected to the bus bar or terminal 114. When the ON/OFF switch 68 is closed, the plunger 62 is attracted toward the core 64 and repelled from the core 60. This action translates the movement of the switch rod 74 toward the enclosure 104. Accordingly, the spring 70 is compressed (not shown), and the spring 72 is expanded. Thus, the bottom contact 90 is connected between the top bus bar 110 and the top bus bar 112, i.e. the positive terminals of the internal and external power source devices are electrically connected. Meanwhile, the bottom contact 92 is connected between the bottom bus bar 114 and the bottom bus bar 116, i.e. the negative terminals of the internal and external power source devices are electrically connected.

Similarly, if the negative terminal of the external power source is connected to the bus bar or terminal 112 and the positive terminal of the external power source is connected to the bus bar or terminal 114, when the ON/OFF switch 68 is closed, the plunger 62 is attracted toward the core 60 and repelled from the core 64. This action translates the movement of the switch rod 74 toward the enclosure 100. Accordingly, the spring 70 is expanded (not shown), and the spring 72 is compressed. Thus, the top contact 96 is connected between the top bus bar 110 and the bottom bus bar 114, i.e. still the positive terminals of the internal and external power source devices are electrically connected. Meanwhile, the top contact 98 is connected between the top bus bar 112 and the bottom bus bar 116, i.e. still the negative terminals of the internal and external power source devices are electrically connected.

It will be appreciated that the arrangement of the bottom switch contacts 90,92, the top switch contacts 96,98, the top bus bars 110,112, and the bottom bus bars 114,116 can be varied within the scope and spirit of the invention. It will also be appreciated that connection arrangement of the positive and negative terminals of the internal power storage source or battery 40 can be varied within the scope and spirit of the invention. For example, the positive terminal of the internal battery 40 can be connected to the top bus bar 112, and the negative terminal of the internal battery 40 can be connected to the bottom bar 114, etc. It will be appreciated by a person skilled in the art that the connection arrangement can be varied as long as the positive and negative terminals of the internal power source are disposed in a diagonal position.

Therefore, even if a user applies the clamps to the wrong terminal connections, i.e. negative to positive or positive to negative between the external and the internal power sources, the switch 50 automatically switches to a proper polarity.

Further, as shown in FIGS. 8–12, the switch 50 is arranged and configured in such a manner that the switch 50 is able to fit in the housing 22. The housing 22 provides inside grooves to retain the switch 50 as well as many other components, such as cables, cigarette lighter wires, and the display wires, etc.

It will be appreciated that other types of suitable switches can be used without departing from the present invention. The examples of the other types of switches, but not limited to these examples, are solid-state switches, other electro-mechanical switching devices. It will be also appreciated that other conventional polarity detection/protection devices, or automatic polarity sensing battery charger devices can be used without departing from the present invention.

While a particular embodiment of the invention has been described with respect to its application for providing power to a battery, such as jump starting a vehicle, etc., it will be understood by those of skill in the art that the invention is not limited by such application or embodiment for the particular components disclosed and described herein. It will be appreciated by those skilled in the art that other circuit configurations that embody the principles of this invention and other applications therefor can be configured within the spirit and intent of this invention. The circuit configuration described herein is provided as only one example of an embodiment that incorporates and practices the principles of this invention. Other modifications and alterations are well within the knowledge of those skilled in the art and are to be included within the broad scope of the appended claims.

We claim:

1. A portable battery booster apparatus for boosting an electrical system with a first terminal and a second terminal, comprising:
   a) a battery having a first terminal and a second terminal;
   b) a housing enclosing the battery and the first and second terminals of the battery;
   c) a switch having a first pair of contacts and a second pair of contacts, the switch being enclosed in the housing;
   d) a first cable with a first end connected to the first terminal of the battery and a second end selectively connected to a first contact of the first pair of contacts of the switch, the first cable being enclosed in the housing;
   e) a second cable with a first end connected to the second terminal of the battery and a second end selectively connected to a second contact of the first pair of contacts of the switch, the second cable being enclosed in the housing;
   f) a third cable with a first end connected to a first contact of the second pair of contacts of the switch, the first end of the third cable being partially enclosed in the housing;
   g) a fourth cable with a first end connected to a second contact of the second pair of contacts of the switch, the first end of the fourth cable being partially enclosed in the housing;
   h) a first clamp connecting to a second end of the third cable, the first clamp being detachably mounted onto a first side of outside of the housing;
   i) a second clamp connecting to a second end of the fourth cable, the second clamp being detachably mounted onto a second side of the outside of the housing; and
   j) wherein when the electrical system is boosted by the battery booster apparatus, the first clamp and the second clamp connect to the first terminal and the second terminal of the electrical system, respectively, such that the first and second terminals of the battery are electrically connected to the first and second terminals of the electrical system, the switch switches connections between the first pair of contacts and the second pair of the contacts to ensure that the first terminal of the battery and the first terminal of the electrical system have the same polarity, and the second terminal of the battery and the second terminal of the electrical system have the same polarity.

2. The apparatus of claim 1, further comprising an ON/OFF switch connected between the battery and the switch, wherein when the ON/OFF switch is off, the switch is in a neutral, non-contacting position, the first pair of contacts are not electrically communicated with the second pair of contacts, when the ON/OFF switch is on, the electrical system is boosted by the battery.

3. The apparatus of claim 1, wherein the electrical system is another battery.

4. The apparatus of claim 1, wherein the switch comprises:
   a coil assembly having a longitudinal axis, the coil assembly including:
      a first coil, disposed around outside of the coil assembly, winding around a first core which is disposed inside of the coil assembly;
      a second coil, disposed around outside of the coil assembly, winding around a second core which is disposed inside the coil assembly; and
      a third coil, disposed around outside of the coil assembly and between the first coil and the second coil, winding around a plunger, the plunger being movable along the longitudinal axis between the first and second cores;
   wherein the plunger is moved to a first contacting position when the first terminals of the battery and the electrical system have the same polarity and the second terminals of the battery and the electrical system have the same polarity, the plunger is moved to a second contacting position when the first terminals of the battery and the electrical system have the opposite polarity and the second terminals of the battery and the electrical system have the opposite polarity.

5. The apparatus of claim 4, wherein the switch is arranged and configured by a double pole double throw switch.

6. The apparatus of claim 4, further comprising an ON/OFF switch connected between the battery and the switch, wherein when the ON/OFF switch is off, the switch is in a neutral, non-contacting position, the first pair of contacts are not electrically communicated with the second pair of contacts, when the ON/OFF switch is on, the electrical system is boosted by the battery, the ON/OFF switch is operated outside of the housing.

7. The apparatus of claim 6, wherein the switch is arranged and configured by a double pole double throw switch.

8. The apparatus of claim 7, wherein the first pair of contacts are arranged and configured to be a pair of bottom switch contacts and a pair of top switch contacts, wherein when the plunger is in the first contacting position, the bottom switch contacts are connected to the second pair of contacts, and when the plunger is in the second contacting position, the top switch contacts are connected to the second pair of contacts.

9. The apparatus of claim 4, wherein the coil assembly has a bobbin shape with two dividers for separating the first, second, and third coils from each other.

10. The apparatus of claim 9, further comprising an enclosure for enclosing the coil assembly, wherein the plunger extends from the enclosure and connects to a double pole double throw switch.

11. The apparatus of claim 1, further comprising switch retention grooves for retaining the switch in one side of the housing.

12. The apparatus of claim 11, further comprising cable retention grooves for retaining the first, second, third, and fourth cables to the housing.

13. The apparatus of claim 12, further comprising battery retention grooves for retaining the battery to the housing.

14. The apparatus of claim 1, further comprising a first holster for receiving and covering the first clamp and a second holster for receiving and covering the second clamp, wherein the first and second holsters are attached to the outside of the housing.

15. The apparatus of claim 14, wherein the first and second holsters are pivotably connected to the housing.

16. The apparatus of claim 1, further comprising a display for displaying a level of charge remaining in the battery.

17. The apparatus of claim 1, further comprising a cigarette lighter receptacle member disposed on the housing and electrically connected to the battery, the receptacle member providing power to an electrical system which equips with a cigarette lighter plug.

18. The apparatus of claim 1, further comprising a cigarette lighter plug member extending from the housing and electrically connected to the battery, the plug member being connectable to a power source outside the housing to recharge the battery inside the housing.

19. The apparatus of claim 1, further comprising a handle for carrying the battery booster apparatus, wherein the housing and the handle form a portable box unit.

20. A portable, auto-polarity battery booster apparatus for boosting an electrical system with a positive terminal and a negative terminal, comprising:

a) a power storage device having a positive terminal and a negative terminal;

b) a housing enclosing the power storage device and the positive and negative terminals of the power storage device;

c) an auto-polarity switch enclosed in the housing for connecting between the power storage device and the electrical system;

d) a first cable with one end connected to the positive terminal of the power storage device and another end selectively connected to the switch, the first cable being enclosed in the housing;

e) a second cable with one end connected to the negative terminal of the power storage device and another end selectively connected to the switch, the second cable being enclosed in the housing;

f) a third cable with one end connected to the switch;

g) a fourth cable with one end connected to the switch;

h) a first clamp connecting to another end of the third cable and disposed outside of the housing;

i) a second clamp connecting to another end of the fourth cable and disposed outside of the housing; and j) wherein when the positive and negative terminals of the electrical system are electrically connected to the first and second clamps, respectively, the switch switches to a first contacting position to ensure the positive terminal of the battery is electrically connected to the positive terminal of the electrical system, and the negative terminal of the battery is electrically connected to the negative terminal of the electrical system.

21. A portable, auto-polarity battery booster apparatus for boosting an electrical system with a positive terminal and a negative terminal, comprising:

a) a housing;

b) a battery, the battery having charges to provide power to the electrical system, the battery having a positive terminal and a negative terminal, the battery being enclosed in the housing;

c) a plurality of connecting members, the connecting members electrically connecting between the terminals of the battery and the terminals of the electrical system, the plurality of connecting members being enclosed in the housing, two of the plurality of connecting members being partially extended from the housing; and d) a switch, the switch being arranged and configured to electrically connect between the battery and the electrical system, the switch being enclosed in the housing, the switch automatically switching between a first connecting position and a second connecting position to ensure that the positive terminal of the electrical system is electrically connected to the positive terminal of the battery and that the negative terminal of the electrical system is electrically connected to the negative terminal of the battery.

* * * * *